United States Patent
Syeda-Mahmood et al.

(10) Patent No.: US 6,621,941 B1
(45) Date of Patent: Sep. 16, 2003

(54) SYSTEM OF INDEXING A TWO DIMENSIONAL PATTERN IN A DOCUMENT DRAWING

(75) Inventors: Tanveer F. Syeda-Mahmood, Cupertino, CA (US); John C. Handley, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/389,113

(22) Filed: Sep. 2, 1999

Related U.S. Application Data

(60) Provisional application No. 60/112,927, filed on Dec. 18, 1998.

(51) Int. Cl.[7] .............................. G06K 9/54; G06F 17/30
(52) U.S. Cl. .......................... 382/306; 382/181; 707/3
(58) Field of Search ........................... 382/113, 168, 382/170, 173, 181, 209, 219, 241, 276, 278, 293, 298, 305, 306; 358/403, 404; 707/1, 3–7, 100, 102, 103, 502

(56) References Cited

U.S. PATENT DOCUMENTS

| | | | | |
|---|---|---|---|---|
| 5,742,807 A | * | 4/1998 | Masinter | 707/1 |
| 5,897,637 A | * | 4/1999 | Guha | 707/101 |
| 5,953,451 A | | 9/1999 | Syeda-Mahmood | 382/187 |
| 6,134,338 A | * | 10/2000 | Solberg et al. | 382/113 |

OTHER PUBLICATIONS

Tanveer Syeda–Mahmood (Indexing of Handwritten Document Images)—1997 IEEE.*
Yehezkel Lamdan and Haim J. Wolfson, "Geometric Hashing: A general and Efficient Model–Based Recognition Scheme", 1/88, pp. 238–249.
Haim J. Wolfson and Yehezkel Lamdan, "Transformation Invariant Indexing", in Geometric Invariants in Computer Vision, IT Press, pp. 334–352, 1992.
Frank C.D. Tsai, "Geometric Hashing with Line Features", Pattern Recognition, vol. 27, No. 3, pp. 377–389, 1994.
W. Eric L. Grimson and Daniel P. Huttenlocher, "On Sensitivity of Geometric Hashing", in Proceedings International Conference on Computer Vision, pp. 334–339, 1990.
George Bebis, Michael Georgiopoulos and Niels Da Vitroia Lobo, "Learning Geometric Hashing Functions for Model–Based Object Recognition", in Proceedings International Conference on Computer Vision, pp. 334–339, 1990.
Isidore Rigoutsos and Robert Hummel, "Massively Parallel Model Matching: Geometric hashing on the connection machine", in IEEE Computer, pp. 33–41, Feb. 1992.

* cited by examiner

*Primary Examiner*—Bhavesh M. Mehta
*Assistant Examiner*—Kanji Patel
(74) *Attorney, Agent, or Firm*—Gary B. Cohen; Philip E. Blair

(57) ABSTRACT

A document processing system including a plurality of model images stored in a memory is provided. The model images are represented by a first information set with the first information set varying as a function of object-based coordinates. At least one of the plurality of model images includes a text containing region having index information intended for use in storing one or more document pages. Moreover, a query image represented as a second set of information varying as a function of object-based coordinates is provided. In practice, an image localization module corresponds the second set of information with a portion of the first set of information to obtain the text containing region, and a text extraction module extracts the index information from the text containing region to facilitate the storing of the one or more document pages.

24 Claims, 14 Drawing Sheets

SYSTEM OF INDEXING A TWO DIMENSIONAL PATTERN IN A DOCUMENT DRAWING

This Application is based on the Provisional Application No. 60/112,927, filed Dec. 18, 1998.

The present application is cross referenced to U.S. patent application Ser. No. 09/389,110 entitled "Method of Indexing a Two Dimensional Pattern in a Document Drawing Using a Geometric Hash Tree" and U.S. patent application Ser. No. 60/112,966 entitled "Method for Creating a Geometric Hash Tree in a Document Processing System", both of which were filed on the same date as the present application.

FIELD OF THE INVENTION

This invention relates to pattern localization and, more particularly, to a system combining two dimensional pattern localization with text recognition to enable indexing text keyword extraction.

BACKGROUND OF THE INVENTION

Image content-based retrieval is becoming a powerful alternative/addition to conventional text annotation-based retrieval. Even so, it has yet to reach the robustness and computational effectiveness of text-based retrieval. Text-based retrieval, on the other hand, is notoriously lacking in precision, even when boolean combinations of key-words are allowed. It is a common observation with those using popular conventional search that full text indexing of documents (scanned or electronic) causes a large number of irrelevant documents to be retrieved.

A more productive use of text-based querying is when it is combined with image content-based querying. A special case of this occurs when the text strings relevant for indexing documents occur within image structures, such as text in special regions of a news video or text within region fields of a form. Retrieval based on such structured text can yield fewer but more relevant matching documents.

An example of the above-mentioned special case arises in the area of processing engineering drawing documents, a large number of which still exist in paper form. Creating electronic conversion of such documents is an important business for large format scanner makers. As is known, large format scanners can scan engineering drawing documents at a relatively fast rate of 25 sheets/minute, and are quickly giving rise to very large databases (in excess of 100,000 objects) of large-sized drawing images (e.g., 14000×9000 pixels). Currently, indexing of such documents is done manually with skilled keyboard operators, and is considered a highly labor intensive activity constituting a significant cost in the digitizing of scanned images. Manual indexing by a keyboard operator can also be unreliable since the key-words employed by a user may not match the ones attached to the documents during database creation.

In contrast to full-text indexing of pure text documents, automatic full-text indexing using conventional OCR algorithms will not yield useful results for drawing images. Fortunately, useful text information for indexing such drawing images is found in specific image structures called "title blocks". Typically, a title block will include information pertinent for indexing a corresponding drawing, such as part number, name of the unit being depicted, date of design, and architect name. Indexing keyword extraction from such image structures requires that the image structures themselves be first identified.

As will appear from the Detailed Description below, the present invention employs some of the principles underlying a solution for a model indexing problem, namely the principles underlying "Geometric Hashing". Referring to articles by Y. Lamdan and H. J. Wolfson (entitled "Geometric hashing: A general and efficient model-based recognition scheme", in Proceeding of the International Conference on Computer Vision, pages 238–249, 1988, and "Transformation invariant indexing" in Geometric Invariants in Computer Vision, IT Press, pages 334–352, 1992), Geometric Hashing has been used to identify objects in pre-segmented image regions. Another work extending the basic geometric hashing scheme for use with line features includes an article by F.C.D. Tsai entitled "Geometric hashing with line features" in Pattern Recognition, Vol. 27, No. 3, pages 377–389, 1994. An extensive analysis of the geometric hashing scheme is provided in an article by W. E. L. Grimson and D. Huttenlocher entitled "On the sensitivity of geometric hashing", in Proceedings International Conference on Computer Vision, pages 334–339, 1990.

Obtaining suitable geometric hash functions has also been explored in an article by G. Bebis, M. Georgiopolous and N. Lobo entitled "Learning geometric hashing functions for model-based object recognition" in Proceedings International Conference on Computer Vision, pages 543–548, 1995, and a discussion of using the concept of "rehashing" in the context of geometric hashing is provided in an article by I. Rigoustos and R. Hummel "Massively parallel model matching: Geometric hashing on the connection machine" in IEEE Computer, pages 33–41, February 1992.

As mentioned above, manual indexing of drawing documents can be time-consuming and thus undesirable. Moreover, pertinent indexing text may be more readily obtainable from two dimensional patterns (e.g., title blocks) embedded in previously stored drawing documents. Identifying these embedded patterns, however, can be difficult since orientation and/or location of the patterns, relative to many other adjacent patterns, is typically unknown. It would be desirable to provide an indexing system that obtains indexing information automatically from a previously stored first set of drawing documents by localizing a query image with respect to the previously stored first set of drawing documents and then extracts corresponding text therefrom for use in storing a second set of drawing documents.

SUMMARY OF THE INVENTION

In accordance with the present invention there is provided a document processing system, comprising: a memory; a plurality of model images stored in said memory, the model images being represented by a first information set with the first information set varying as a function of object-based coordinates, at least one of the plurality of model images including a text containing region having index information intended for use in storing one or more document pages; a query image represented as a second set of information varying as a function of object-based coordinates; an image localization module, communicating with said memory, for corresponding the second set of information with a portion of the first set of information to obtain the text containing region; and a text extraction module, communicating with said image localization module, for extracting the index information from the text containing region to facilitate the storing of the one or more document pages.

BRIEF DESCRIPTION OF THE DRAWINGS

The accompanying drawings, which are incorporated in and form part of the specification, illustrate an embodiment of the present invention and, together with the description, serve to better explain the operation features, and advantages of the invention. It should be understood, however, that the invention is not limited to the precise arrangements and instrumentalities shown.

FIG. 2A is an elevational view of a sample handwritten document image;

FIG. 2B is an elevational view of a handwritten query word;

FIG. 2C is an elevational view of a subject query word projected at candidate locations;

FIGS. 9 and 10 are respective elevational views of two title blocks extracted from the reduced engineering drawing document sheets of FIG. 8;

DETAILED DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 3:
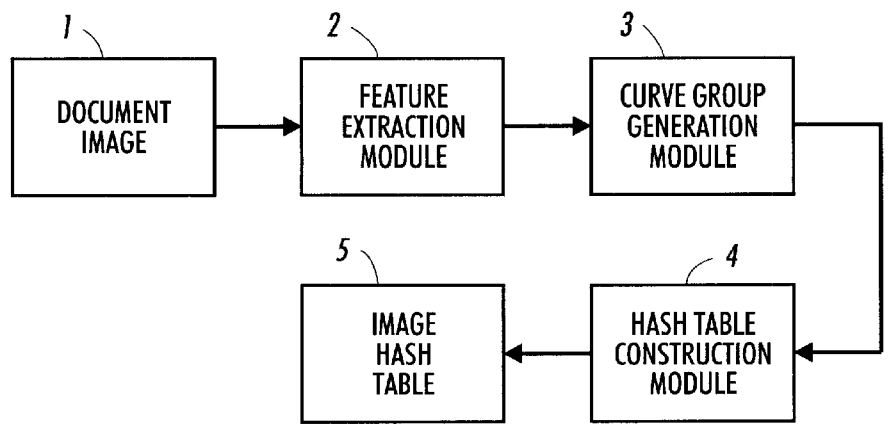
FIG. 3 is a block diagram implementation employable in constructing hash tables.

Referring to FIG. 3, the components for implementing a hash table construction technique are illustrated. In a pre-processing step, original documents obtained by scanning handwritten pages at high resolution (200 dpi or higher) are obtained. Within the Feature Extraction Module 2, connected component regions of scanned Document Images 1 are formed. Although several methods of finding connected components exist, the following algorithm is used to determine the connected components regions in bitmaps:

1. Record run lengths of "on" pixels (assuming white background) per image pixel row using low[i], high[i] arrays that maintain the start and end points of the run lengths.
2. Initially put all runlengths in separate groups denoted by $C\_\{i\}$ for runlength i.
3. For all end point pixels (k,l) in low[i] and high[i] arrays, do the following steps:

Step A: Find the number of "on" neighboring pixels (k',l') and their associated run lengths, and Step B: Merge a given runlength with a neighboring runlength identified with 1. This is recorded by having all merged runlength having the same group identification.

The above algorithm can be efficiently implemented using a data structure called the union-find data structure as described in a book by Cormen, Leisersen and Rivest entitled "Introduction to algorithms", MIT Press, 1994, to run in time linear in the number of runlengths in the image.

Boundary points are determined on the connected component regions as those points that have at least one "off" neighbor. A cyclic trace of such boundary pixels is used to yield curves representing the boundaries of the connected component regions. The curves are smoothed using a conventional line-segment approximation algorithm. Finally, corner features are extracted from the curves as those points where significant curvature deviation occurs, i.e., where the angle between two incident lines is greater than a specified threshold. Other methods of curve tracing and corner feature detection can be used without significantly affecting the principles of the presently described embodiment. Note that since the images are assumed to be scanned at high resolution, the lines are thick enough so that junctions are also manifested as corners in such images. Corner features on a curve are chosen as the basic unit for localization using the rationale that although not all curves come from single words, especially in the presence of occlusions and noise, features generated from within a curve are more likely to point to a single image location than an arbitrary triple of features chosen randomly across the image.

The pre-processing step of curve extraction and feature generation can be applied uniformly to a document image or to a query word represented as an image pattern, and takes time linear in the size of the image.

Curve Group Generation

To enable handwriting localization under changes in word appearance due to different intra-word spacing, groups of curves separated by intra-word separation are assembled within the Curve Group Generation Module 3. Such a group captures curve segments belonging to the same word.

Detection of a line of text in a handwritten page image involves determining which of the individual word regions lie predominantly along a perceivable line of text. In contrast to the case for printed text, deducing lines of text in handwritten document is difficult because handwritten text words are often not written on a straight line. Furthermore, consecutive lines of text may not be parallel as in printed text. Finally, an author may vary the inter-word and intra-word spacing while writing so that different instances of the same word may show writing differences. This makes the task of determining which word segments belong to a group difficult.

The method of detecting text lines disclosed herein is independent of page orientation, and does not assume that the individual lines of handwritten text are parallel. Furthermore, it does not require that all word regions be aligned with the text line orientation.

The first operation performed on a bitmap image of a handwritten document is to pre-process the image using the Feature Extraction Module 2 of FIG. 3 to generate connected components of dark regions constituting word segments as well as curves formed from the boundaries of such connected regions. This pre-processing stage also records the centroids of the regions. The orientation of the word segment regions is determined as the direction of the moment-of-inertia axis of the region. The formula for finding the moment of inertia axis is given in Chapter 3 of the book entitled "Robot Vision" by B. K. P. Horn, MIT Press, 1986.

A histogram of orientations is generated and its peaks automatically selected to represent major word orientations in the image. For each of the dominant orientations selected, a line of the specified orientation is drawn through the centroids of each of the regions. A clustering of these lines is done to determine groups of such lines. The Hough transform described in a book by D. Ballard and C. Brown entitled "Computer Vision", Prentice-Hall, Chapter 4, pages 123–124, 1982, was used to record this information. The resulting data structure, called the Hough transform table, is a two-dimensional array that records the number of points (centroids of region here) that lie along or close to a line of specified orientation and position. The highest valued entries in this table are taken to correspond to candidate lines of text. The regions whose centroids contribute to the peak table entries are noted. These word segment regions thus are taken to form the lines of text in the handwritten document image.

The curve groups capture word segments that form part of the same word. Once the lines of text, and hence the word segments that lie along a line of text, are determined, grouping involves assembling all such word segments that are separated by a distance—characterizing intra-word separation. The intra-word separation is estimated as follows:

For each line of text determined above, the boundaries of the word segment regions lying on the line are used to determine two external points per region; that is, all the boundary points of a region are projected onto the line, and the beginning and end points noted. A projection of a given point onto a line is the point of intersection of a perpendicular line through the given point with the given line.

All such projections are now sorted in an increasing order along the line, using a conventional sorting algorithm. Distances between the end point of a region and the beginning point of another are noted to represent separations between word segments. These distances are recorded for all lines of text.

A histogram of such distances is generated. For most handwritten documents such a histogram shows at least two distinct peaks. The peak at the lowest separation distance is noted as intra-word separation. Using the intra-word separation, curve groups are formed by grouping word segment regions that are separated along the line of text orientation by a distance within a certain bound of the intra-word separation determined above. The grouping of curves separated by intra-word separation (+/− a chosen threshold) is done using the union-find data structure mentioned earlier.

Image Hash Table

Using the features derived above, a data structure called an image hash table is developed within the Hash Table Construction Module 4 and is used to succinctly represent information in the position of features in curves in curve groups in a manner that helps locate a query handwritten word. To understand the idea of an image hash table, suppose for the sake of simplicity, each curve group consists of a single curve. Suppose the task is to locate a given query curve in an image including this curve. Consider three consecutive non-collinear feature points $(O, P_1, P_2)$ on the given query curve. Then it is well-known that the coordinates of any other point P of the curve can be expressed in terms of the coordinates of points $(O, P_1, P_2)$ (called basis triples) as:

$$OP = \alpha OP_1 + \beta OP_2$$

The coordinates $(\alpha, \beta)$ are called affine coordinates and they are invariant to affine transformations. Thus if the given curve appears in the image skewed, or rotated, the corresponding points on the transformed image curve will have the same coordinates with respect to the transformed basis triples in the transformed image curve. Thus, one way to check if a curve at an image location matches a given curve is to see if enough feature points on the image curve have the same affine coordinates with respect to some image basis triple $(O', P'_1, P'_2)$ on the image curve. In this case, it can also be inferred that the basis triples on the image curve and the given (query) curve correspond. From such a correspondence, the pose information can be derived as an affine transform:

$$(A, T) = \begin{pmatrix} a & b \\ c & d \end{pmatrix} + \begin{pmatrix} T_1 \\ T_2 \end{pmatrix}$$

that is obtained by solving a set of linear equations as:

$$\begin{pmatrix} O_x & O_y & 0 & 0 & 1 & 0 \\ 0 & 0 & O_x & O_y & 0 & 1 \\ P_{1x} & P_{1y} & 0 & 0 & 1 & 0 \\ 0 & 0 & P_{1x} & P_{1y} & 0 & 1 \\ P_{2x} & P_{2y} & 0 & 0 & 1 & 0 \\ 0 & 0 & P_{2x} & P_{2y} & 0 & 1 \end{pmatrix} \begin{pmatrix} a \\ b \\ c \\ d \\ T_1 \\ T_2 \end{pmatrix} = \begin{pmatrix} O'_x \\ O'_y \\ P'_{1x} \\ P'_{1y} \\ P'_{2x} \\ P'_{2y} \end{pmatrix}$$

where $(O_x, O_y) = O$ and x and y refer to the x and y coordinates of the points O, and so on.

Construction of Image Hash Table

Since occlusions, noise, and other changes can cause a triple of basis points on the given curve to not be visible in the corresponding image curve, affine coordinates of all points with respect to more sets of basis triple points may have to be recorded. The resulting Image Hash Table 5 (FIG. 3) is a data structure representing a convenient way to express this computed information so that the entries are the basis triples that give rise to a range of affine coordinates. The image hash table is constructed within the Hash Table Construction Module 4 using a suitable quantization of the affine coordinates, and recording the basis points that give rise to the respective affine coordinates. That is:

$$H(\alpha 1 \leq \alpha < 2, \beta 1 \leq \beta < \beta 2) = \{<O', P'_1, P'_2>\ldots\}$$

so that for any given affine coordinate $(\alpha, \beta)$ of a point, the possible basis points that gave rise to it can be found by looking in the hash table in the entry $\alpha\_\{1\} <= \alpha\_\{2\}$, $\beta\_\{1\} <= \beta < \beta\_\{2\}$. Generalizing to the case of more curves in a curve group, the image hash table is constructed as follows:

Each triple of consecutive features in a curve is used as a basis triple, and the affine coordinates of all features in the curve group are computed. Thus the basis points are taken from a single curve, but the affine coordinates are computed for all features on all curves in a curve group.

Since consecutive triples of features are used for basis points, only a linear number of basis points need to be recorded unlike $O(N^3)$ in straightforward geometric hashing. Also, the size of the hash table is $O(N^2)$ as against $O(N^4)$ in ordinary geometric hashing. The computational feasibility of this scheme together with its ability to localize objects makes it an improvement over various known approaches of geometric hashing.

As will appear from the description below, the illustrated implementation of FIG. 3 could be used to create a geometric hash tree. For example, module 4 could be used for constructing the geometric hash tree and the geometric hash tree data structure would result in Geometric Hash Tree 5.

Indexing or Word Localization

Figure 4:
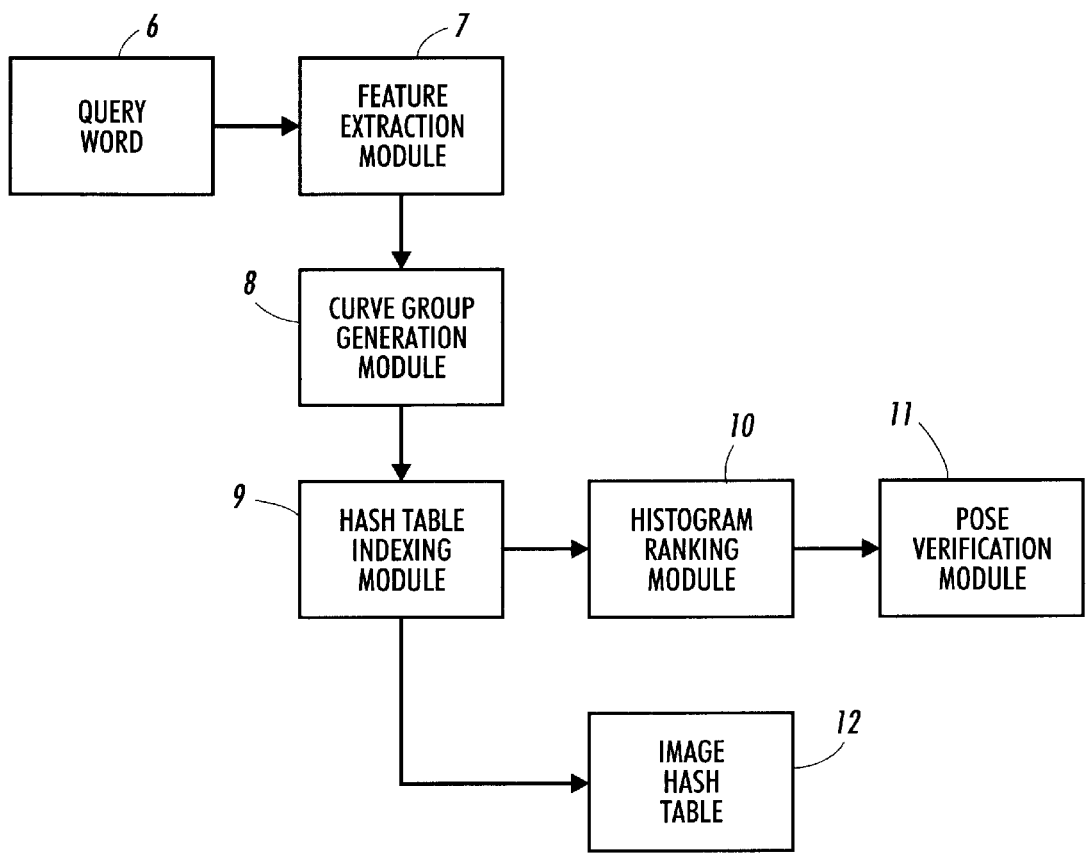
FIG. 4 is a block diagram implementation employable in performing image indexing of hash tables.

Referring to the block diagram in FIG. 4, a Query Word 6 is given to the system during indexing, and curve groups are generated from the word using the pre-processing steps and requisite modules 7 and 8 for feature generation described in FIG. 3. The word localization is attempted first using curve groups of longer average curve lengths. For each such curve group, sets of affine coordinates are computed within the Indexing Module 9 and used to index the Image Hash Table 12. Since the number of basis points are linear, this operation can be repeated with respect to all basis points in the curve group for robustness. For each basis triple that was indexed using the affine coordinates, the number of times it was indexed (called a hit) as well as the corresponding query triple are recorded.

A histogram of the number of hits and the corresponding query word and matching basis points in the document image are recorded within the Histogram Ranking Module 10. The peaks in the histogram are then taken as the candidate locations for the query.

The indexing of the hash table accounts for the breaking of words into word segments in the image (or query word) by generating a set of affine coordinates as follows:

1. Let intra-word separation be: $T=(t_1,t_2)$.
2. For each basis triple $<O,P1,P2>$, and a given feature point P, compute affine coordinates $(\alpha,\beta)$, and $(\alpha'_k,\beta'_k)$ where:

$$\begin{bmatrix} \alpha'_k \\ \beta'_k \end{bmatrix} = \begin{bmatrix} \alpha \\ \beta \end{bmatrix} + \begin{bmatrix} (p_{1x}-o_x) & (p_{2x}-o_x) \\ (p_{1y}-o_y) & (p_{2y}-o_y) \end{bmatrix}^{-1} \begin{bmatrix} kt1 \\ kt2 \end{bmatrix}$$

and where k is a number representative of the number of curves in a curve group. The value of k is meant to be tuned to the handwriting style of the author (i.e., the way he or she writes words in his or her characteristic style).

3. Use each of the affine coordinates to index the hash table and record peaks in the histogram of hits as described before.

Verification.

The last step of word localization verifies the word at the candidate locations given in the indexing step. This is conducted by the Pose verification module 11. This step involves recovering the pose parameters (A,T) by solving the set of linear equations for the matching basis points corresponding to the significant hits.

Using the pose parameters, all points (i,j) (includes corner features) on curves of the query word are projected into the document image at location (i',j') where, $$\begin{pmatrix} i' \\ j' \end{pmatrix} = \begin{pmatrix} a & b \\ c & d \end{pmatrix} \begin{pmatrix} i \\ j \end{pmatrix} + \begin{pmatrix} T_1 \\ T_2 \end{pmatrix}$$

It is then verified if a point feature on each curve in the image lies within some neighborhood of the projected point. The ratio of matched projected points to the total number of points on all curves in the query word constitutes a verification score. The verification is said to succeed if this score is above a suitably chosen threshold. If no matching basis points are verified, then the next most significant query curve group is processed. The approach is repeated, if necessary, until no more significant groups are left. In practice, however, the correct query localization is achieved early in the indexing operation using the strongest query curve.

As will appear from the description below, the indexing (or object localization)/verification scheme described above could be implemented alternatively with a geometric hash tree instead of a hash table.

EXAMPLE 1

Figure 1:
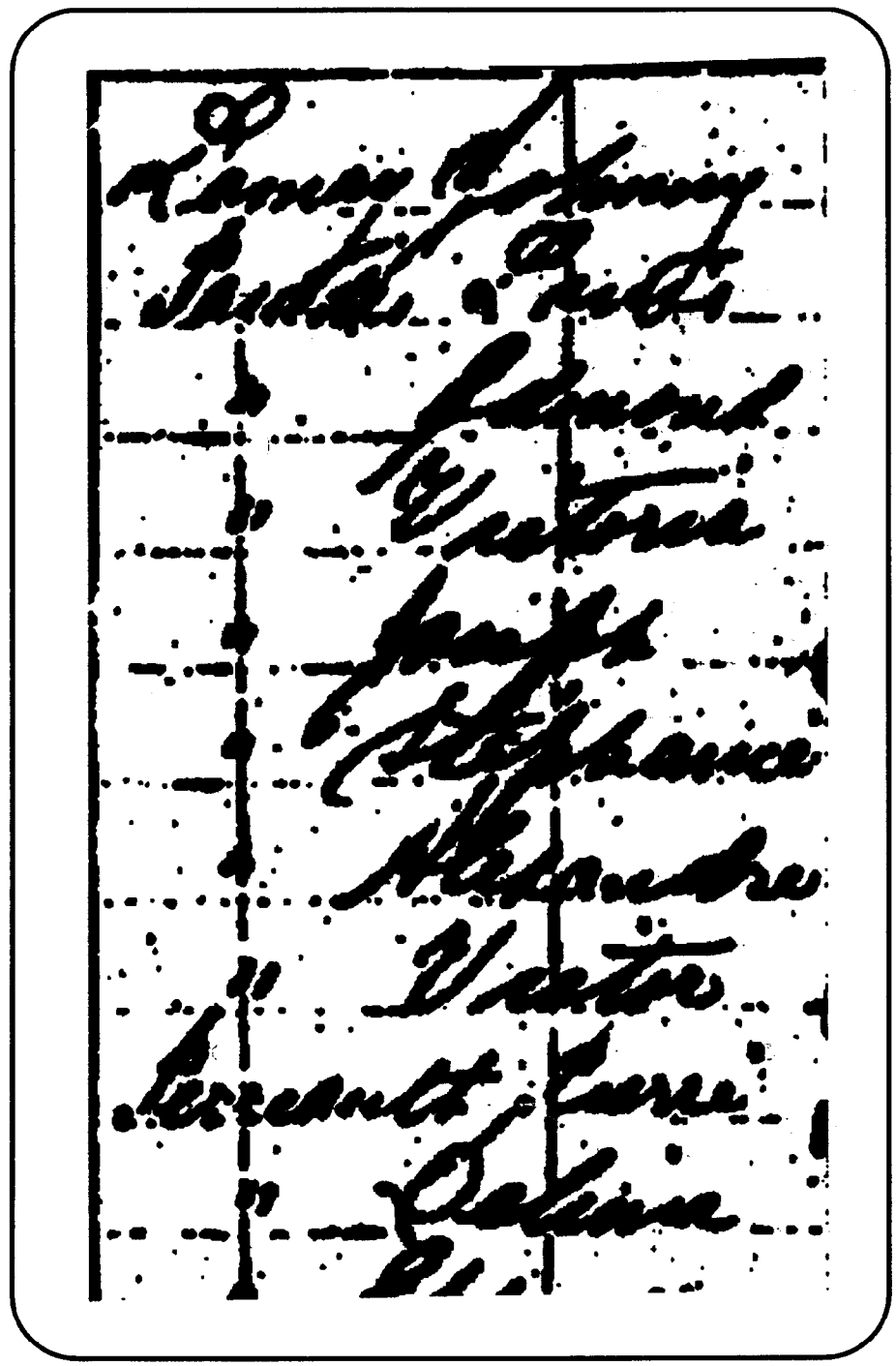
FIG. 1 is an elevational view of a scanned image of a sample handwritten document.
Figure 5A:
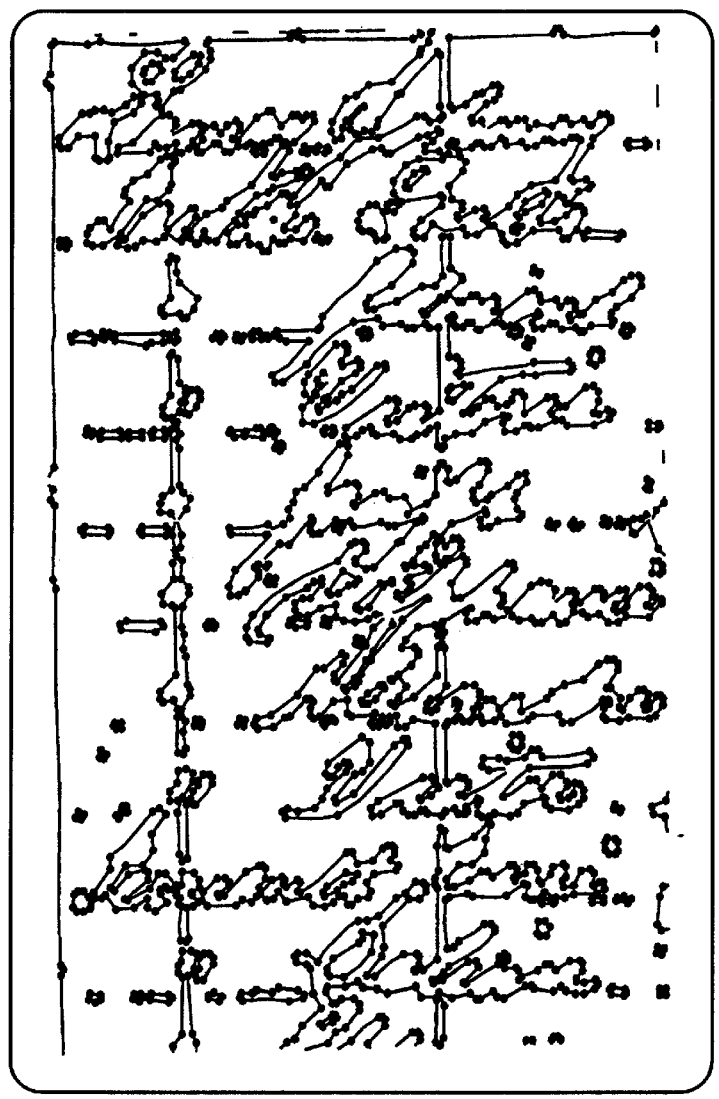
FIG. 5A is an elevational view of curves in the handwritten sample document of FIG. 1, wherein corner features on the curves are shown in circles.
Figure 5B:
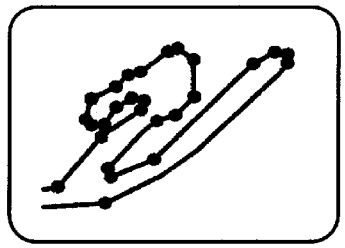
FIG. 5B is an elevational view of a query pattern including a single curve, wherein corner features of the curve are used for indexing in a hash table.
Figure 6:
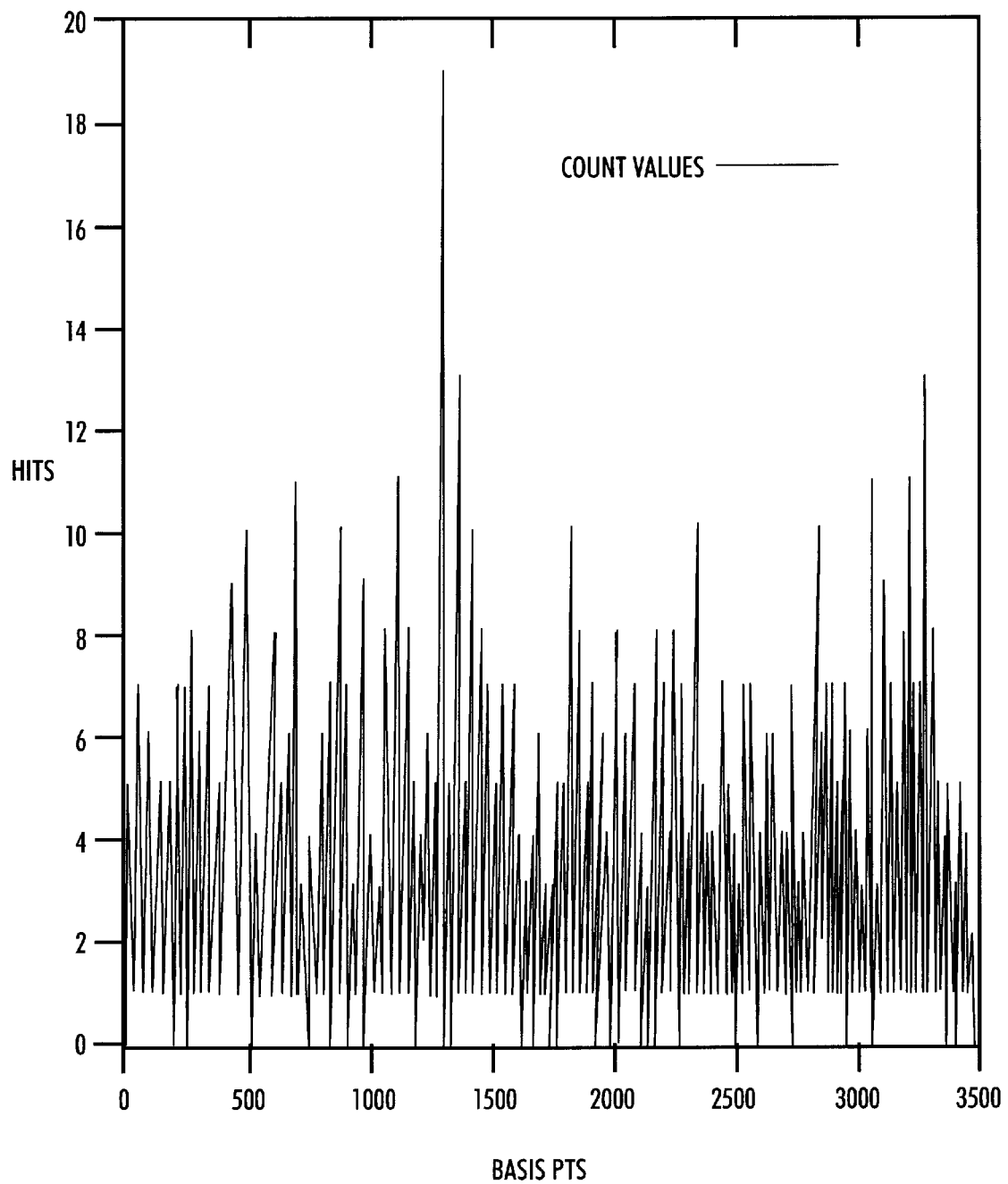
FIG. 6 is a schematic, graphical view of a histogram of hits for all basis points in the image of FIG. 5A.
Figure 7:
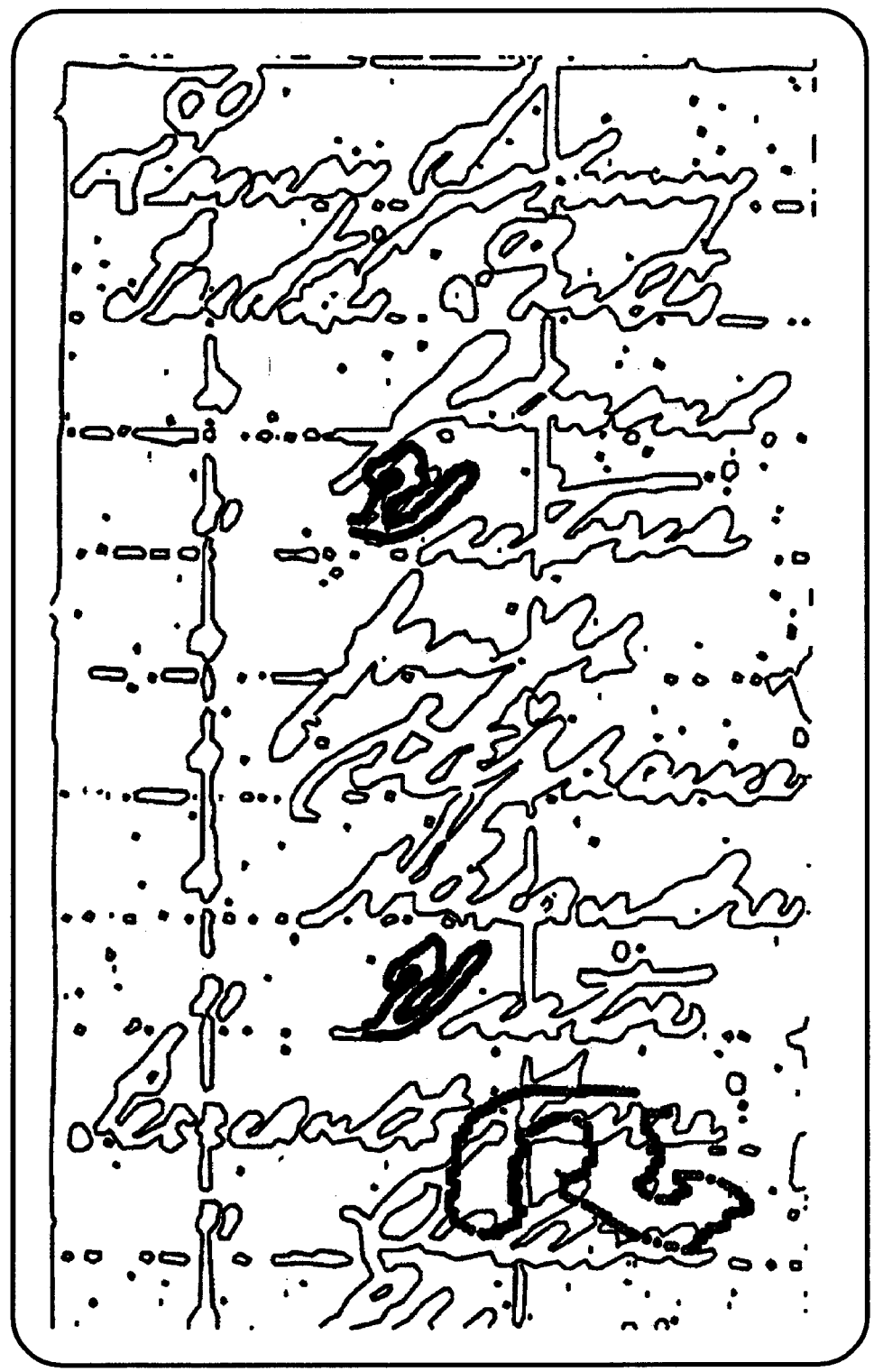
FIG. 7 is an elevational view representing Hashing results for FIG. 5A.

FIG. 1 shows a scanned handwritten document and FIG. 5A shows the result of pre-processing and feature extraction on that image. The corner features per curve used for hash table construction are shown as circles in FIG. 5A. There are 179 curves and 2084 corners in all the curves combined. These give rise to 3494 basis points for the hash table. FIG. 5B shows a query pattern consisting of a single curve. FIG. 6 shows the histogram of hashing based on affine coordinates. Here the image basis points are plotted against the number of hits they obtained from affine coordinates on the query pattern. FIG. 7 shows the results of hashing.

The hashed image basis points corresponding to the three most significant peaks of the histogram are matched to their respective query basis triples to compute candidate poses. The query curve is then projected into the image using the pose parameters and shown overlayed on the original image in FIG. 7. As can be seen, the top two matches localize the query pattern correctly at the two places it occurs. The third match is however, a false positive which can be removed during pose verification. The false positive occurs in this case because of a merging of the foreground text patterns with the lines of the tabular background in the image.

Figures 2A, 2B, 2C:
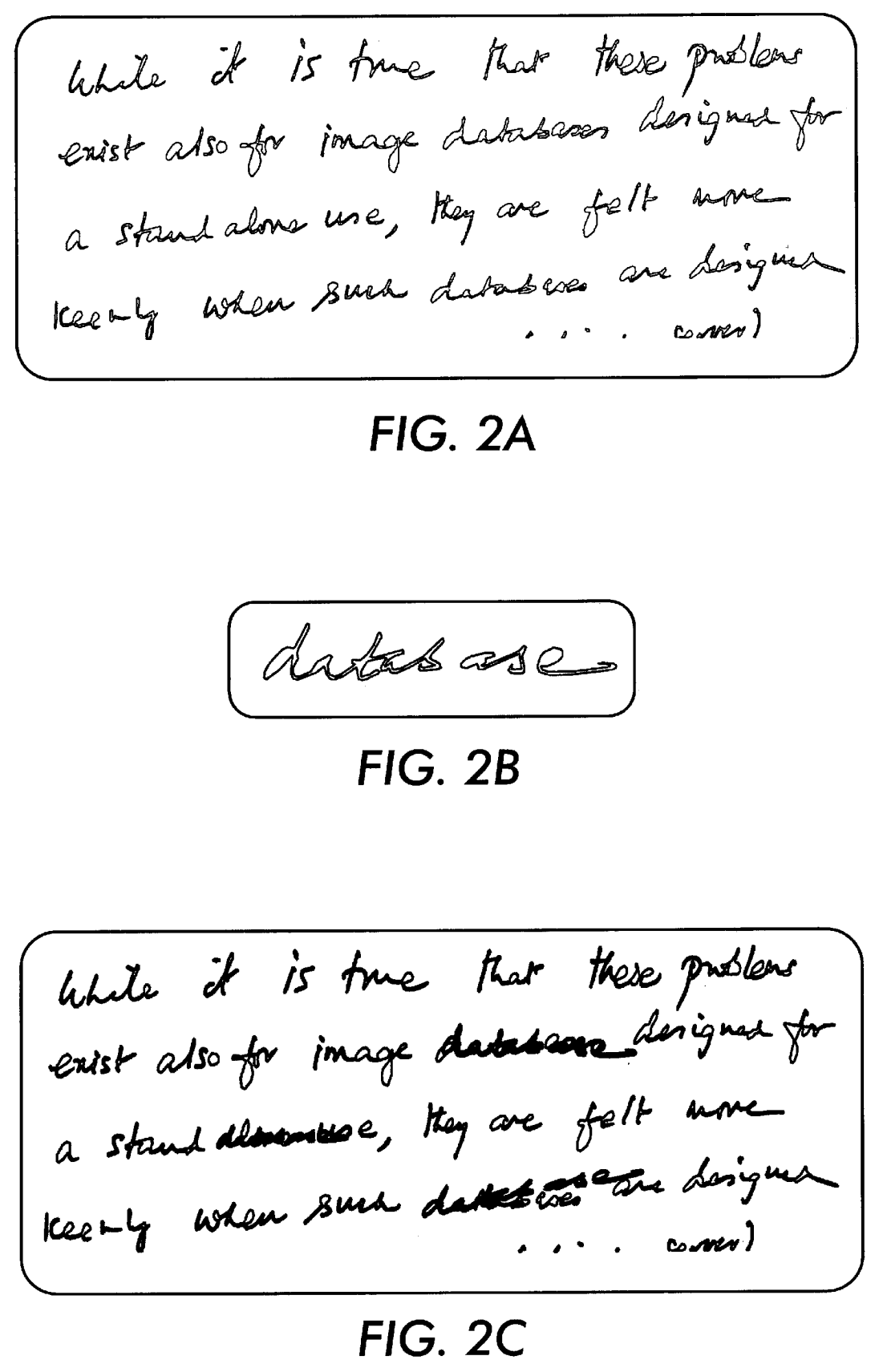

Referring back to FIG. 2, another illustration of query localization by hashing is shown, this time using curve groups. FIG. 2A shows a sample document in which a word "database" occurs twice. The query word "database" is illustrated in FIG. 2B. The inter-letter spacing between letters of the word is not uniform in the two instances. The query pattern used for indexing is shown in FIG. 2C. Once again the top three matches are shown overlayed (after pose solution) on the original image to indicate query localization. Notice that using the indexing scheme, the word has been localized even when its constituent letters are written with different spacings in the two instances in which it occurs in the image. The false positive match shown here persisted even after pose verification, because of the similarity with the underlying word based on corner features.

Extension to Handwriting Tokenization.

By choosing the query handwritten word to be one of the curve groups in the image itself, the above method can be used to identify multiple occurrences of the word in the document without explicitly matching to every single word in the document as is done by other tokenization schemes. Also, by using affine invariant features within curve groups, such a tokenization scheme is robust to changes in orientation, skew, and handwriting variances for a single author.

Localizing 2d Object Queries in Databases.

1. Overview

The following description, which incorporates many of the principles described above, relates to a system for performing location hashing for engineering drawing indexing. It will be appreciated by those skilled in the art, however, that the system described below could be employed advantageously with a wide variety of document processing systems.

In the following description, the problem of indexing title block patterns in a drawing database is considered. Specifically, a technique for indexing arbitrary 2d pattern queries in images of a database, called location hashing is provided, and the technique is applied to the problem of localization of title blocks in engineering drawing images. Location hashing is a variation of geometric hashing and determines simultaneously the relevant images in the database and the regions within them that are most likely to contain a 2d pattern. An engineering drawing indexing system that localizes title blocks using location hashing, and extracts indexing text keywords from these regions is also described. This enables retrieval of drawing documents using the conventional machinery of text.

2. Title Block Localization.

Figure 8:
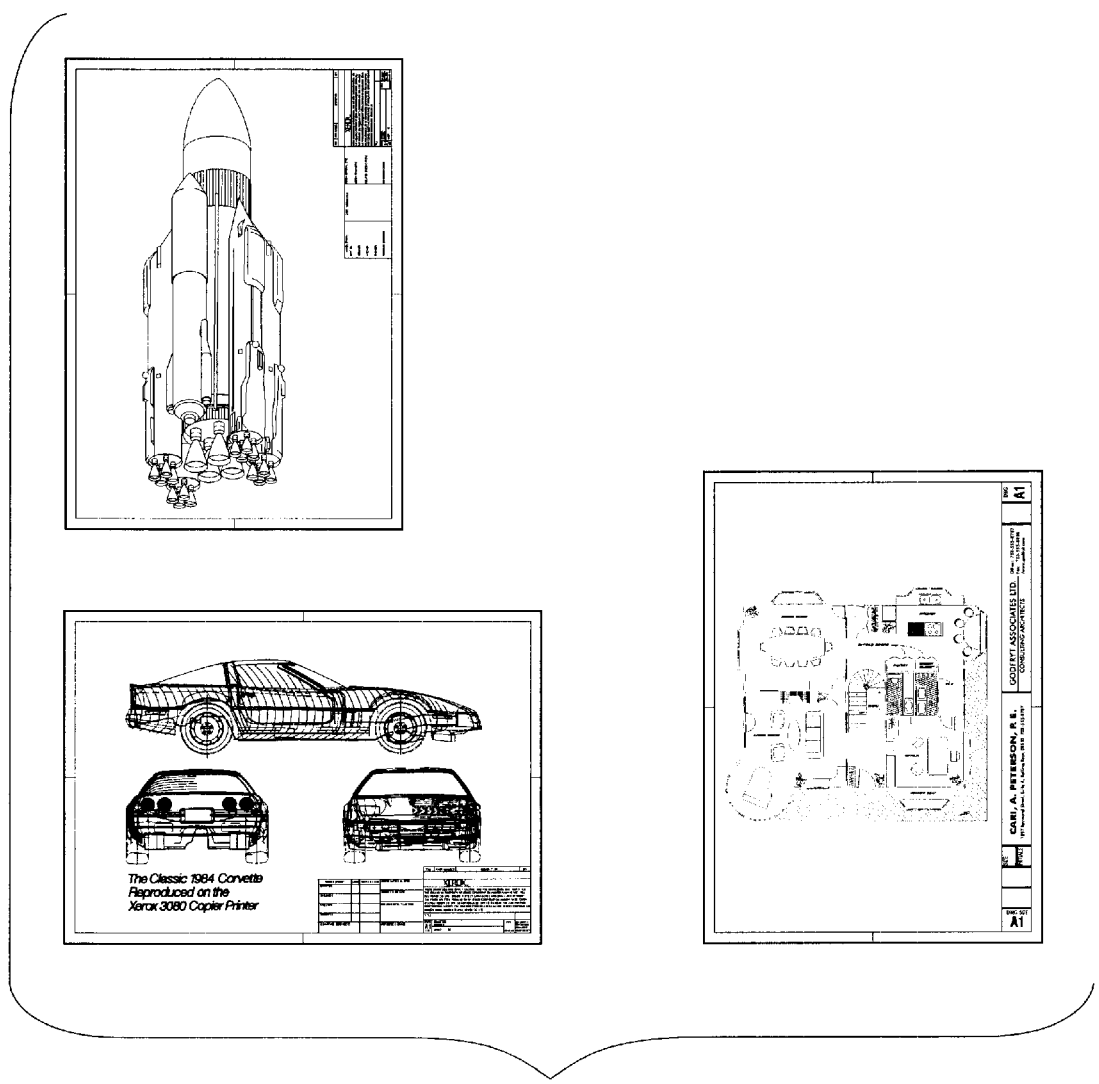
FIG. 8 is an elevational view of three reduced engineering drawing document sheets.
Figure 9:
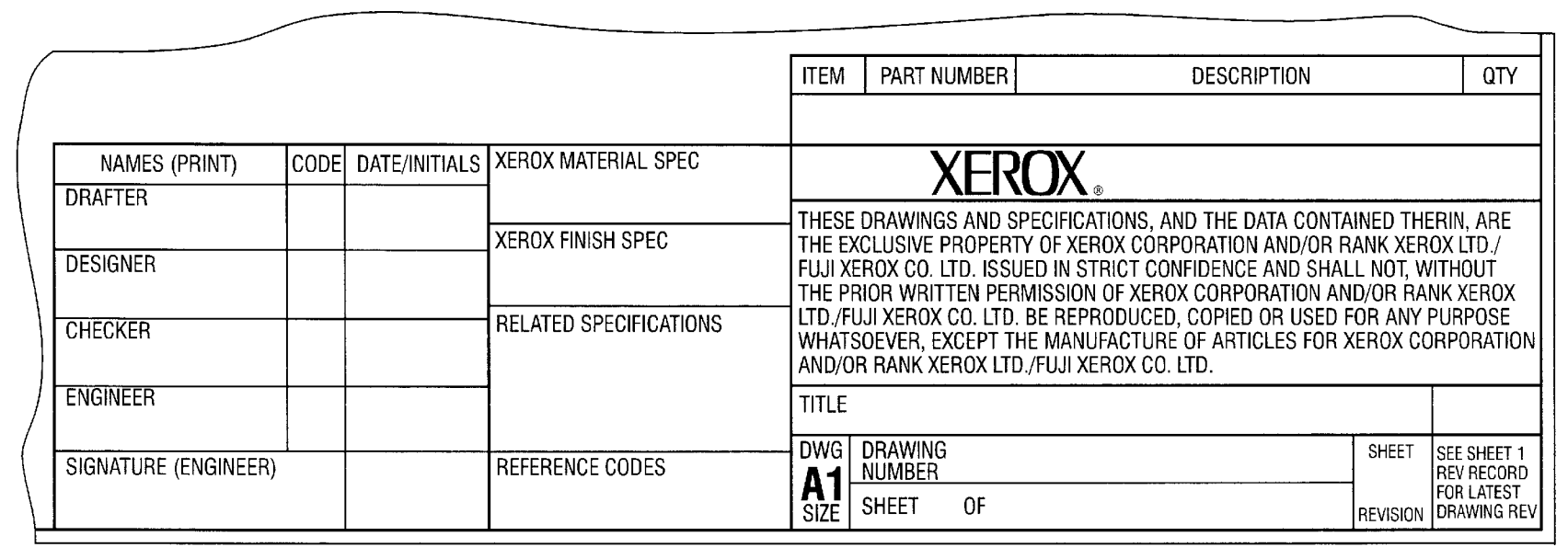
Figure 10:
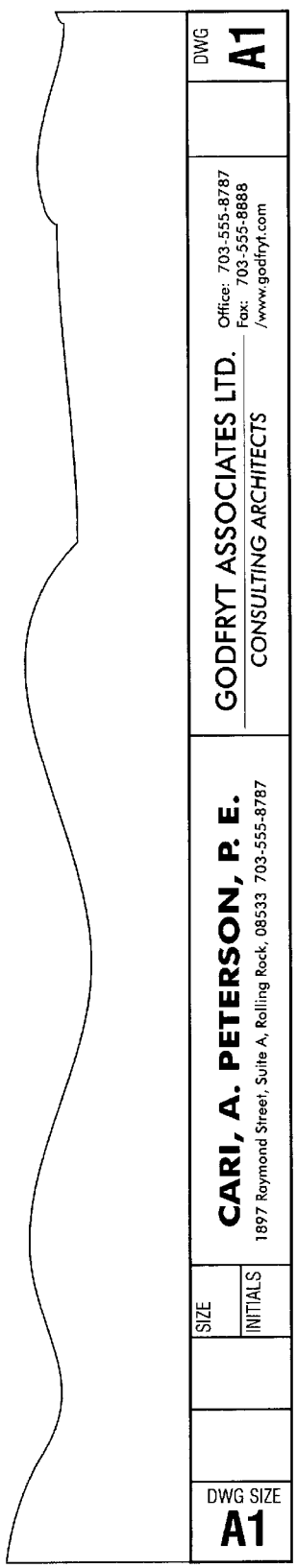

The detection of title block patterns in unsegmented drawing images is a difficult problem for several reasons. First, title blocks are 2d patterns that can be of different styles. Referring to FIGS. 9 and 10, it will be noted that different title blocks or patterns may exist across drawing sets. These patterns can be drawn at different locations in a drawing (FIG. 8), and they can appear in different orientation, depending on the scanning process. Moreover, title blocks may be confused with other tabular pattern regions appear merged with other contours, and/or exhibit noisy and spurious features due to scanning resolution. Finally, since title block patterns are originally hand-drawn, even patterns of the same basic type may show variations in the relative positions of the contours in addition to variations in field information.

Although a number of forms recognition software packages are available (e.g., Accuform, FIRST,OmniForm), these approaches generally recognize forms in constrained poses within images that more or less contain the form itself. These are insufficient for purposes of engineering drawing indexing, not only because title block patterns must be recognized in a pose-invariant fashion, but also because they must first be indexed. That is, the relevant images of the database as well as the relevant regions in images that are likely to contain the title block must be identified.

For this reason, title block localization is regarded as an instance of the general problem of localizing 2d pattern queries in unsegmented images of a database. This is one of the most difficult problems in content-based retrieval, and is believed to have been addressed by only a relatively few researchers. A solution to this problem requires computationally effective approaches that can identity relevant images of the database as well as candidate regions in such images that are likely to contain the pattern. The solution should be achievable without detailed search of either the database or the images themselves.

A technique for localization of 2d patterns in image databases, called location hashing is now presented. In the present technique, geometric hashing is varied for the purpose of enabling image indexing of databases. The basic premise underlying geometric hashing and the development of a hash table H was discussed in detail above.

2.1 Location Hashing

Location hashing addresses the problem of image indexing. That is, the goal is to use the hashing technique to not only identity relevant images of a database that contain a pattern query but also localize a region in the image that contains the 2d pattern. Geometric hashing in its original form, is not viewed as being directly applicable to location hashing for two reasons. First, if the hash table were constructed in an entirely analogous manner by considering all possible basis triples, this would be computationally prohibitive. In particular, it can be shown that the size of a hash table for images is expressed as $O(P*N^4)$, where P is the number of images and N is the number of features per image. For a typical image, N is of the order of 1000 features (corners, for example), so that even with one image in the database, the size of the hash table can grow to be $O(N^4)$ $\sim 10^{12}$, an impossible size for a hash table.

Secondly, if the affine coordinates of all features are computed with respect to all basis triples, the highest number of hits may be for a basis that comes from any arbitrary triple of features distributed across the image. Thus hashing for the largest number of hits need not correspond to a single image location. Both these problems can be alleviated if feature grouping is done prior to creating the hash table. Achieving reliability in grouping, however, has been found to be difficult even for a single object, let alone for all objects occurring in scenes. Also current grouping schemes give considerably more number of groups than the number of objects in an image, to avoid false negatives. This would again cause an increase in the size of the hash table.

Location hashing takes an intermediate course in building the hash table that is in between the version with fully grouped features, and the version with no grouping that considers all possible basis triples. In particular, features are selected from structures that are likely to come from single objects, and then features are grouped loosely to provide a small number of groups. Specifically, a curve is chosen as a basic unit for generating features, and consecutive corner features are chosen along the curve for generating the basis points. Curves are chosen based on the rationale that although not all curves come from single objects, (especially in the presence of occlusions and noise) features generated from within a curve are more likely to point to a single image location than an arbitrary triple of features chosen randomly across the image.

Further, the use of curve ordering in choosing consecutive corner points, ensures that only a linear number of basis features need to be recorded in the hash table. Curves alone, however, may not include sufficiently large groups to perform robust indexing. Prior work has also stated that the reliability in indexing is increased by the use of large groups, unless the groups themselves are unreliable. Therefore, we form groups of curves for indexing. A number of curve grouping techniques are available in literature. The choice of a grouping constraint can vary with the application domain, and will not be specified here. The grouping constraint should, however, ensure that a small number (possibly linear number) of groups be generated through relatively fast methods.

2.2. Location Hash Table Construction

Figure 11:
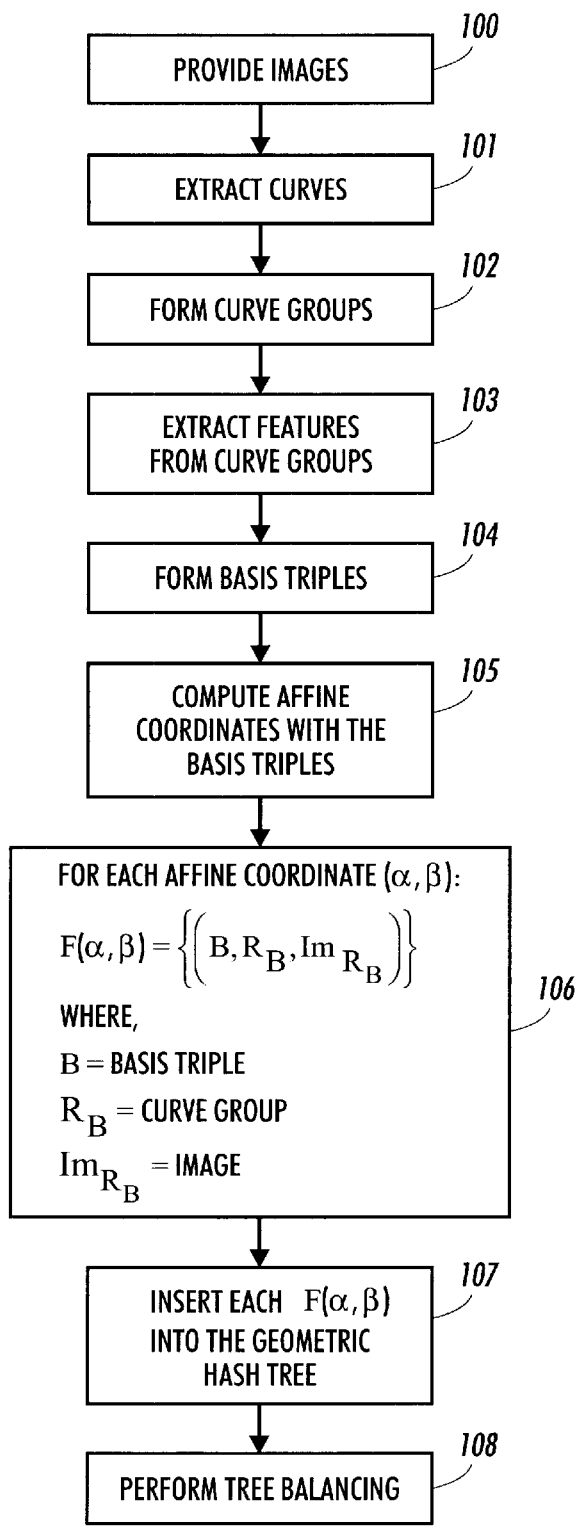
FIG. 11 is a flow diagram illustrating a process for generating a geometric hash tree from a geometric hash table.

This section, along with the following section 2.3 is intended to be read in conjunction with the flow diagram of FIG. 11. Accordingly, numbers referencing that diagram are provided throughout the description below.

Referring to step 100 of FIG. 11, model images are provided to a data base (step 100). Curves are extracted (step 101) from all images of the database, and consecutive corner features are noted. A group of curves (curve-group) is formed (step 102) using a suitable grouping technique (one such grouping is mentioned in the next section), and features are extracted from curve groups (step 103). Basis triples are formed from consecutive features (step 104) along the curves. For each basis triple on a curve in a curve-group, the affine coordinates of all other features in the curve group are computed (step 105). This process is repeated for all curve groups in all images of the database. For each basis triple B, the curve-group $R_B$ is noted to serve as a location index. Further, the image $Im_{R_B}$ to which each basis triple B belongs is noted. As a result, each affine coordinate $(\alpha, \beta)$ is associated with a list of triples, $$F = \{(B, R_B, Im_{R_B})\}$$

which is then stored in the hash table (step 106).

In practice, the hash table is a quantized version of the affine coordinate space, with the level of quantization being a function of the image size as well as feature sets. Although the sizes of the images can vary in a database, each type of database has its own typical size. Thus an engineering drawing database may consist of high resolution scanned engineering drawings of sizes 9000×14000, while a scene image database generated from video camera would typically include images of sizes 512×640. The feature sets also determine the hash table quantization, particularly based on the distribution of features. In engineering drawing images, for example, the curves tend to be long lines with sharp corners at ends, causing the affine coordinates of consecutive points along curves to be farther apart, allowing a coarser quantization. In general, a fine quantization is suitable when precise matches to queries need to be found, but can be expensive in terms of the amount of memory required. A coarse quantization allows flexibility in matching a query to a stored model, but can result in an undesirable amount of false matches.

2.2.1 Geometric (or Location) Hash Tree

Even after a suitable quantization is chosen, the resulting array size of a corresponding affine coordinate plane can be quite large. For example, using a typical engineering drawing database domain, an observed range of each affine coordinates is in the range (−10000.0, 10000.0). Using a quantization level of 1.0, a straightforward array implementation would result in an array size of about $4 \times 10^{11}$ or 40 Gbytes, too large a table to fit in the main memory of any existing computer. Such a uniform partition of the affine coordinate space is unnecessary, as only a few of the units are non-empty, thus suggesting a more compact representation.

In the image database of the above, no more than 2000 of the $4 \times 10^{11}$ cells are typically active. The location hash table can, therefore, be physically represented through more compact structures such as a balanced binary search tree (steps 107, 108). To achieve a more compact structure, a simple 2d ordering was used on associated affine coordinates, and the active entries were organized in the affine coordinate plane as a binary search tree.

Figure 12:
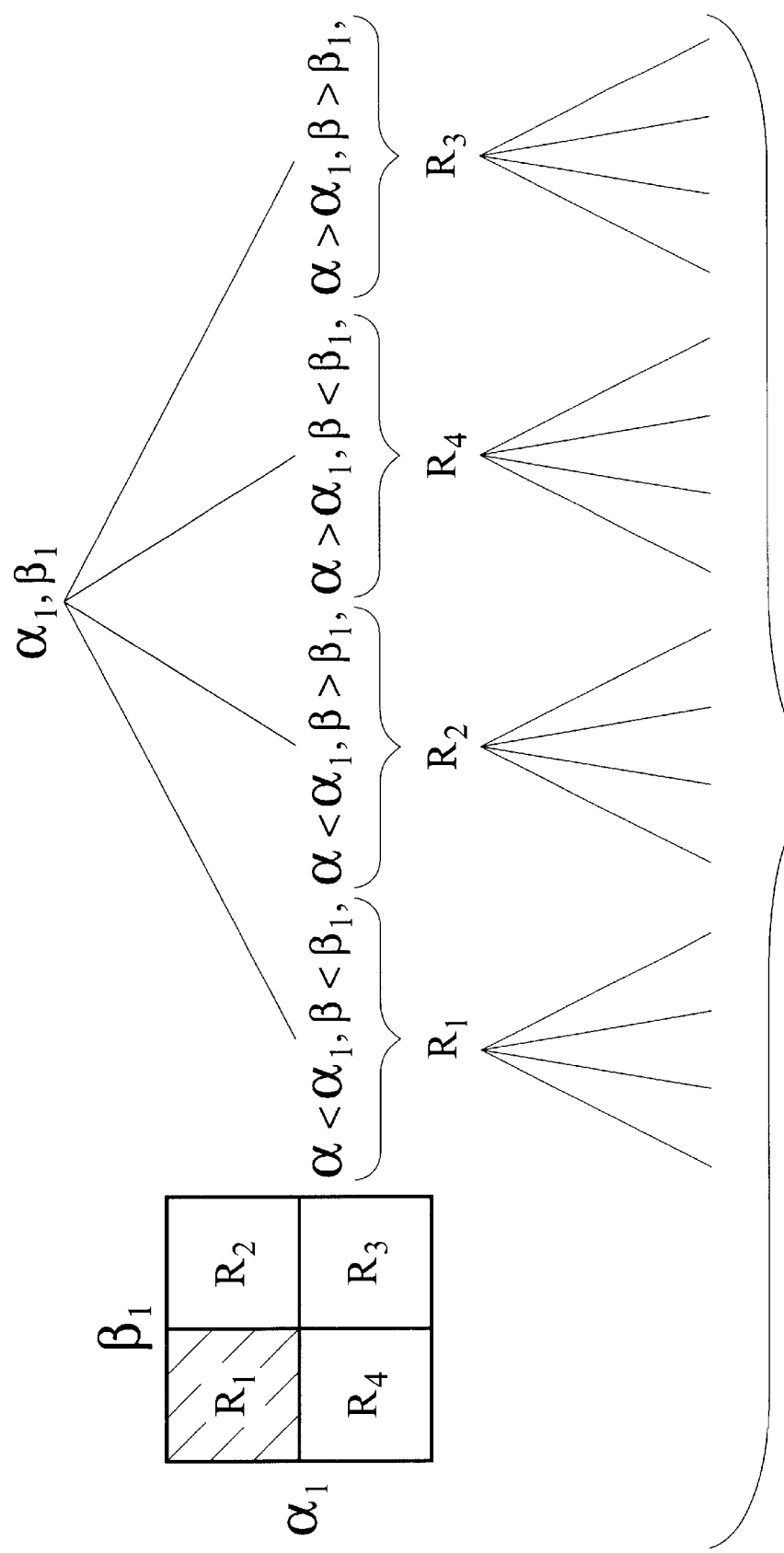
FIG. 12 is a schematic, graphical representation illustrating a manner in which the geometric hash table is partitioned, in accordance with the process of FIG. 11, to from the geometric hash tree.

In one example, the space of affine coordinates $(\alpha, \beta)$ are partitioned into halves. While, as discussed immediately below, the partitioning can be of several types, a simple scheme was chosen in which the node ordering is such that all nodes in the left subtree of a node with value $(\alpha_1, \beta_1)$ have their affine coordinates $(\alpha, \beta)$ such that $(\alpha < \alpha_1, \beta < \beta_1)$, and all nodes in the right subtree have either $\alpha \geq \alpha_1$ or $\beta \geq \beta_1$, but not $(\alpha ==_1$ and $\beta = \beta_1)$. As shown in FIG. 12, the curve groups representative of one or images can be partitioned in four ways (as opposed to two ways). It should be appreciated the process of FIG. 11 contemplates partitioning in multiple ways (e.g. into quarters or halves).

To keep the binary search tree balanced, we choose to represent it as a red-black tree. A red-black tree is a binary search tree with additional color information attached to each tree node, and obeys the following properties: (1) Every node is either red or black; (2) Every leaf (NIL) is black; (3) If a node is red, then both its children are black; and (4) Every simple path from a node to a descendent lead contains the same number of black nodes. These properties ensure that a red-black tree remains balanced. In particular, it can be shown that a red-black tree with n internal nodes has height at most 2 log(n+1).

Using the geometric or location hash tree (GHT or LHT) representation, each non-empty entry in the location hash table is represented by a node $N_1$ where, $$N_i = (I_{\alpha_i}, I_{\beta_i}, C(i), Data(i), left(i), right(i)), 1 \leq i \leq N$$

where N is the number of occupied cells in the location hash table, left(i) and right(i) are the left and right pointers. ($I_{\alpha_i}$, $I_{\beta_i}$) are the index of the affine coordinates $(\alpha, \beta)$ in the hash table based on the quantization chosen, and $$C(i) \in \{RED, BLACK\}$$

$$Data(i) = \{F_{j_1}, F_{j_2}, \ldots F_{j_{k_i}}\}$$

$$F_{j_t} = \left(B_{j_t}, R_{B_{j_t}}, Im_{R_{B_{j_t}}}\right)$$

Here C(i) is one of two colors, namely, red or black. The set Data(i) represents the collection of information pertaining to all affine coordinates that fall into the cell represented by ($I_\alpha$, $I_\beta$). $F_{j_t}$ is a list of basis triple information of basis triples giving rise to affine coordinates of the cell, and $k_i$ represents the number of data entries per node i.

2.2.2 Insertion in GHT

After affine coordinates from groups (regions) of images are generated, the GHT is constructed as follows: Each new affine coordinate feature computed can be denoted by z=(key(z), color(z), data(z), NIL, NIL), where key(z)=($I_\alpha$, $I_\beta$), color(z)=RED, and, $$data(z) = \{(B, R_B, Im_{R_B})\}$$

The insertion of the feature involves two steps, namely, tree search and insertion, and tree balancing. The tree insertion is done as in conventional binary search, except that when there is a match of keys at a node, the data elements are updated as given below.

---

TREE-INSERT (T, z)

y = NIL
x = root(T)

```
                TREE-INSERT (T, z)

keymatch = NIL
while x ≠ NIL and keymatch = NIL do
    y = x
    if key[z] < key[x]
        then x = left[x]
        else if key[z] > key[x]
            then x = right[x]
            else data[x] = data[x] ∪ data[z]
                color[x] = RED
                keymatch = TRUE
if keymatch = NIL
    then p[z] = y
    if y = NIL
        then root[T] = z
        else if key[z] < key[y]
            then left[y] = z
            else right[y] = z
```

In the above p[x] stands for the parent of the node x, T is a pointer to the root node of the GHT (which is NIL initially).

Balancing is done as is conventional for a red-black tree, and involves doing search and tree rotations to maintain the balancing properties of the red black tree outlined above. In particular, the binary search tree form of the GHT is modified by recoloring nodes and performing rotations. Most of the code for balancing given below handles the various cases that can arise as the modified tree is established. In the following, it is assumed that TREE INSERT(T,x) given above has been done, and color[x]=RED.

```
                GHT-BALANCE(T, x)

while x ≠ root[T] and color[p[x]] = RED do
    if p[x] = left[p[p[x]]]
        then y = right[p[p[x]]]
        if color[y] = RED
            then color[p[x]] = BLACK
                color[y] = BLACK
                color[p[p[x]]] = RED
                x = p[p[x]]
            else if x = right[p[x]]
                then x = p[x]
                    LEFT-ROTATE(T, x)
                color[p[x]] = BLACK
                color[p[p[x]]] = RED
                RIGHT-ROTATE(t, p[p[x]])
        else
            (same as then clause with "right" and "left" interchanged)
color[root[t]] = BLACK
```

In the above, p[x] stands for the parent of a node x, and LEFT-ROTATE is given by,

```
                LEFT-ROTATE(t, x)

y = right[x]
right[x] = left[y]
if left[y] ≠ NIL
    then p[left[y]] = x
p[y] = p[x]
if p[x] = NIL
    then root[T] = y
    else if x = left[p[x]]
        then left[p[x]] = y
        else right[p[x]] = y
```

```
                LEFT-ROTATE(t, x)

left[y] = x
p[x] = y
```

The code for RIGHT-ROTATE is similar. Both LEFT-ROTATE and RIGHT-ROTATE run in $O(1)$ time. The cost of insertion into an n-node GHT can be accomplished in $O(\log n)$ time, as the height of the GHT (being a red-black tree) is $O(\log n)$.

2.3 Indexing for 2d Patterns

Figure 13:
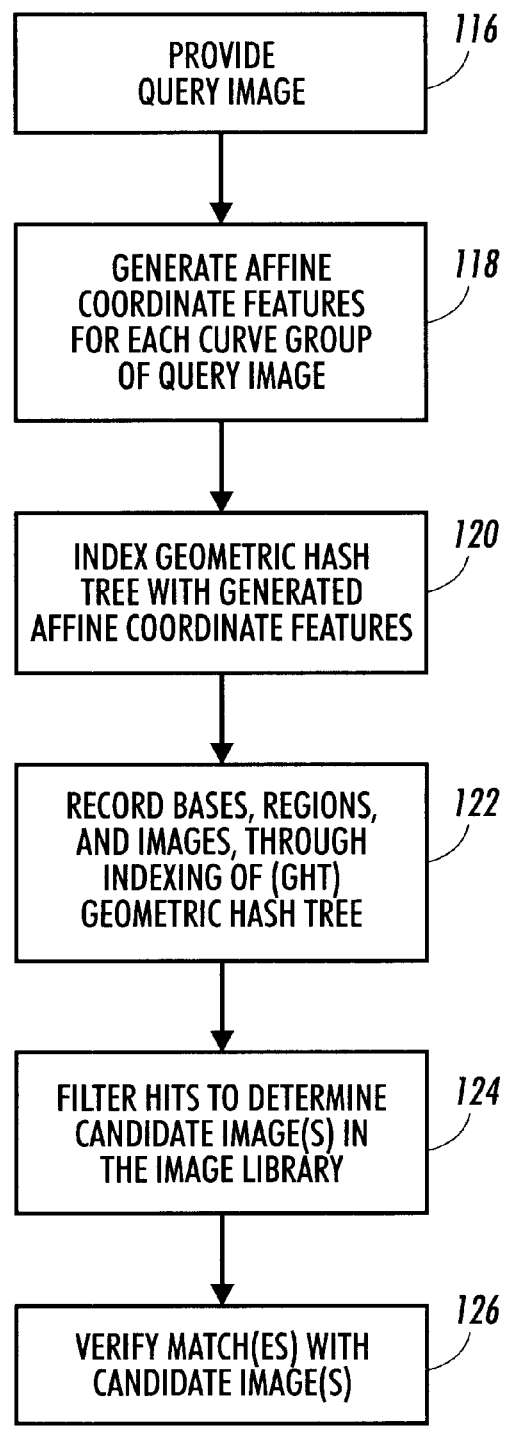
FIG. 13 is a flow diagram illustrating a process for localizing two-dimensional ("2d") patterns in images of databases represented through geometric hash trees.

This section is intended to be read in conjunction with the disclosure of FIG. 13. Referring specifically to step 116 of FIG. 13, a query image or 2d pattern is provided. To localize 2d patterns in images of databases represented through the geometric hash tree, the pattern is processed and affine coordinate features are generated (step 118) in a manner identical to the one described in the previous section. Steps 116 and 118 are comparable to steps 101–105 of the flow diagram in FIG. 11.

Affine coordinate features from each pattern curve-group are successively used to index the GHT (step 120) to retrieve potential matching basis triples and their associated region and image indices. A histogram of the basis triples indexed or "hit" (steps 122, 124) is taken and the peak of the histogram shows the basis triple most likely to match a query basis triple. Similarly, as emphasized by step 124 of FIG. 13, a histogram of regions indexed (taken using affine coordinates generated from several query basis triples), points to the most likely region (and hence the most likely image) to contain the pattern. Since the localization only points to places most likely to contain the object (but not guaranteed to do so), localization is preferably followed by a verification stage (step 126).

Further details regarding localization are given in the following algorithm:

```
                QUERY-INDEX(T, R)

for each F_q ∈ F_Q(R)
    x = LHT-INDEX(T, key(F_q))
    for F_i = ((B_i, R_{B_i}, I_{m_{R_{B_i}}}))
        h(B_i) = h(B_i) + 1
        h(R_{B_i}) = h(R_{B_i}) + 1
B_M = argmax{h(B_i)}
R_M = argmax{h(R_{B_i})}
I_M = I_{m_{R_M}}
```

In the above algorithm, R represents a query region (feature group), and $F_Q(R)$ represents the set of affine coordinate features generated from the query group R. Each affine coordinate feature $F_q=(key(F_q),data(F_q))$, where data $(F_q)=(B_q,R_{B_q})$ and $key(F_q)=(I_\alpha,I_\beta))$ for some affine coordinate $\alpha$ and $\beta$. The indexing of the GHT (LHT (or GHT)-INDEX) is similar to the binary search done prior to TREE-INSERT. On finding a match at a node, the data component of the node is returned. If no match is found, the search bottoms out of a leaf node, and NIL is returned.

The terms h(i) represent histograms of the respective quantities, and $(B_M,R_M,I_M)$ are the most likely basis triple, the most likely region, and the most likely image, respectively, to contain the object query. The first two quantities correspond to the peaks in the histogram of basis triple and region "hits" in the GHT. The image index is the image from which the most likely region arises. The result given by QUERY-INDEX can be accepted with confidence when the $h(B_M)>T_B$ and $h(R_M)>T_R$, for some thresholds $T_B$ and $T_R$ suitably chosen for the domain (for example, an acceptance criterion may be acceptable if over 95% of the query feature groups affine coordinates can be accounted for by some basis triple). Feature groups are used to index the GHT successively, until at least one query region (curve group) succeeds in finding a matching group in the images of a corresponding database. The likely candidate locations must then be verified by projecting the query at the underlying image regions using the transform recovered from a match of the basis.

2.4 Title Block Localization Using Location Hashing

In view of the description above, the location hashing technique for the localization of title block patterns can now be applied. Patterns intended for use with the localization are assumed to be available through a training stage and may be obtained by cropping representative regions from sample images. The feature extraction process (which is applied identically to title blocks and scanned images) is as follows:

Since drawing images can be relatively large in size (e.g., 14000×9000 at 400 dpi scan resolution), they are first normalized to a fixed size (since location hashing is scale-invariant, image normalization does not affect hashing). The scaled and normalized images are further processed to retain only the contour pixels of connected regions. The border contours are traced to give the respective curves. Ordering of points along the curve is then done through a simple depth-first in-order tree traversal.

Next, connected components are extracted from the scaled image. Groups of curves are formed by grouping curves that come from a single connected region. This simple grouping ensures a linear number of groups, and can isolate a region that contains the title block (possibly merged with the surrounding contours). Corner features are extracted from all the curves, and consecutive corner points along single curves are used to form basis triples.

The affine coordinates of all corner features in a group are computed with respect to the basis triples of the group. Similar processing is done for the title block patterns. The quantization level for affine coordinates is chosen from a distribution of the affine coordinates of the title blocks used for training, to give a quantization level suitable for localizing such title blocks. A GHT of the basis points is created where the region and image index of each basis triple is stored along with the basis triple as explained in the previous section.

Starting from the largest curve group on a given title block, each curve group is successively used to index the GHT of the engineering drawing database, until the recorded number of hits confirm a possible match. The resulting matching basis points are used to recover the underlying affine transform and the title block is projected at the indicated location for verification. While corner features are used for location hashing, lines of curve groups are preferably used for verification.

3. Indexing Keyword Extraction

The purpose of title block localization described above was to enable extraction of indexing keywords from localized regions in drawing images. Not all fields of a title block, however, may contain relevant indexing information. For example, in one or both of the title blocks of FIGS. 9 and 10, the values of fields with company label, date, and drawing number, may be deemed important for indexing. Regions containing important indexing information may be marked in a training stage during title block pattern construction. Since the text within a given title block can appear in orientations other than left to right, the orientation of text is preferably noted during training.

Once the title blocks are localized, the relevant text information is extracted as follows. Using the original known position and orientation of the text region, and the computed pose of the localized title block, the relevant text field regions are localized within the title block and an appropriate transformation is derived that allows the text information to appear in the preferred left to right order. These regions are then re-scaled back to original resolution (400 dpi), if necessary, to enable accurate text recognition. Although the title block field labels may be typed fonts, the field values are often handwritten (e.g., date or part number).

More information regarding verification can be found in U.S. patent application Ser. No. 09/215,829, filed Dec. 18, 1998, the disclosure of which is incorporated herein by reference.

Since no reliable generic hand and printed text recognition engine appears to be commercially available, a hand-print recognition system (supplied with the projected and scaled regions for text recognition) was developed. The handprint recognizer is a neural network-based character classifier for hand-printed and machine printed characters.

Digit, alphabetic and alphanumeric recognition can be separately invoked on each text region based on the meta-data provided for the corresponding field during the title block training stage. The training data for the neural network has been obtained from several machine and handprint databases such as the NIST, UNLV databases. Characters recognized are assembled into words, and a lexicon of domain terminology created from the engineering drawings is used to aid the word recognition.

4. An Engineering Drawing Indexing System

A system for extracting indexing keywords was developed for the Windows NT platform. Java-based interfaces were used for easy training on title block patterns, obtained by cropping regions from training drawing images. The metadata (field coordinates, their labels, their orientation) of each indexing field was also noted through dialog boxes. Title block templates could then be used in interactive or batch modes.

In the interactive mode, individual users can invoke indexing of the engineering drawing database (currently, a list of tiff files), using a title block template selected from an available menu. A list of images containing the title blocks is returned along with the recognized text keywords within the regions. These keywords form the indices of their respective drawing images.

The batch mode is similar in approach to the interactive mode, except that a set of templates are used successively to obtain the indexing keywords from corresponding images. The indexing system can also be integrated with a large format document scanner, to scan and index drawings "on the fly". Through the use of efficient algorithms, the feature extraction and GHT construction time has been reduced to about 30 sec per image. Text recognition takes another 30 sec.

Figure 14:
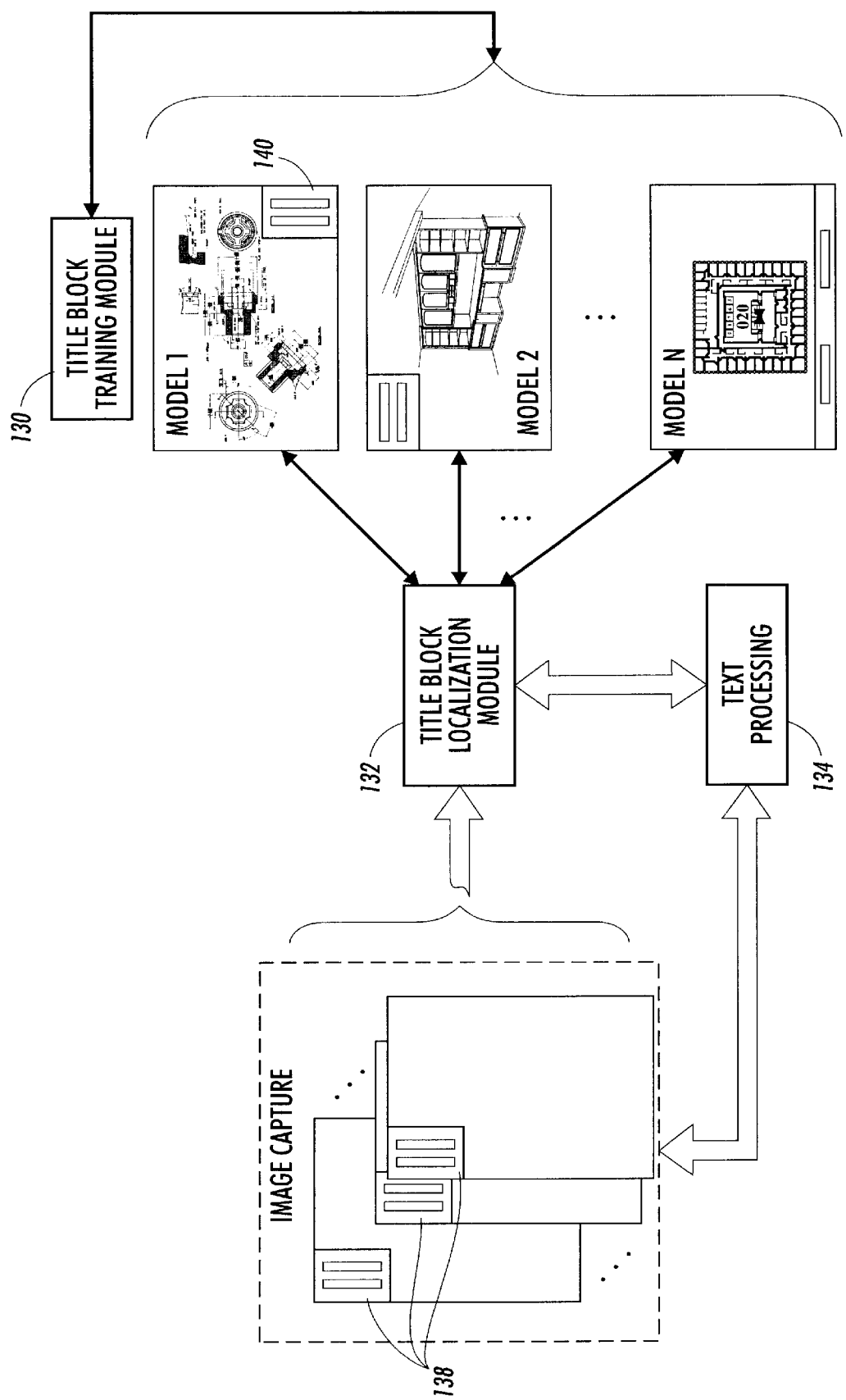
FIG. 14 is a schematic, block diagrammatic view of an engineering drawing indexing system.

Referring now to FIG. 14, a detailed description of the engineering drawings indexing system (designated with the numeral 130) is provided. The system includes a training module (block 132) that learns information necessary to localize and parse the comments of title blocks with the help of an expert user. The three main components of the indexing system are (a) a training module for title block training, (b) a title block localization module (block 134), and (c) a text recognition module (block 136). The indexing system 130 is implementable with a variety of image capture devices, such as a large format scanner. Moreover, the system is intended to operate in at least one of two modes, namely a training mode or a recognition/indexing mode.

The function of the title block training module (block 130 in FIG. 14) is to infer the information from the title block regions of engineering drawings that will be relevant for its later retrieval. The training module includes a Java-based user interface in which a scanned and/or pre-processed engineering drawing image (in tiff format) may be displayed. An expert user highlights the title block region in the drawing, and the training module redisplays the zoomed-in region for the user. The displayed region may be used as a reference image for subsequent computations. The regions in the title block that contain useful indexing information are similarly highlighted by the user (through a mouse interface). A dialog window is subsequently provided for the user to enter metadata about the highlighted region. Currently, the name of the indexing field, its content type (alphabetic, numeric, alphanumeric), text orientation (left to right, top to bottom, etc.), and any additional comments to aid in text recognition are supplied by the user. The text orientation may be important to note, as title block regions often depict text in multiple orientations.

At the end of the training session, the following information is generated about the title block regions: (1) the image region of the title block, (2) the indexing field information that includes their location in the image, and the metadata entered by the user, (3) a normalized and scaled version of the original title block region for each of recognition. The above information may comprise the title block "model" or template information for subsequent use in the indexing stage. This template is stored in a chosen directory and a name selected by the user is assigned as an index to the template description. The template name can then appear in a template menu of a scan subsystem for use during scanning and automatic indexing.

The title block localization module (block 132 in FIG. 14) takes, in one example, a scanned and pre-processed engineering drawing in tiff format and a user-selected title-block template as the input. It detects if a region corresponding to the user-selected template is present in the scanned image. The detection employs the above-described technique of location hashing, in which pose-invariant features are extracted from the title block template as well as the given image. The features in the image are represented compactly and organized for efficient search using a balanced binary search tree, namely the geometric hash tree.

As described above, object-based coordinates (e.g., affine coordinates) can be used to index the GHT to point to candidate locations in images that have a collection of features having the same affine coordinates, and hence the likelihood of the title block region being present. In one example, the top five hits during this indexing are retained and displayed to the user. As contemplated, the top hit points to the location of the title block in the query object or drawing. The localization technique described herein establishes the pose or the orientation of the drawing so that the individual field regions within a given title block can be de-rotated, if necessary, to contain text in the appropriate left to right orientation for initiating text recognition.

The Text Processing module (block 134) module takes the indexing keyword containing regions from the localization module (block 132), the metadata in the chosen title block template, and possibly a lexicon to aid in text recognition with contextual information. The module 134 then performs word recognition (machine and handprint) to give as output keywords to be used for indexing the document. Although designed for recognizing hand-printed text, this module can also recognize machine-printed text. The types of text recognized are: numeric (includes Arabic numerals ranging from 0 through 9), alphabetic (composed of 26 Roman letters from A through Z), and alphanumeric (containing 36 elements from the union of alphabet and numeric classes).

EXAMPLE 2

Figures 15, 16:
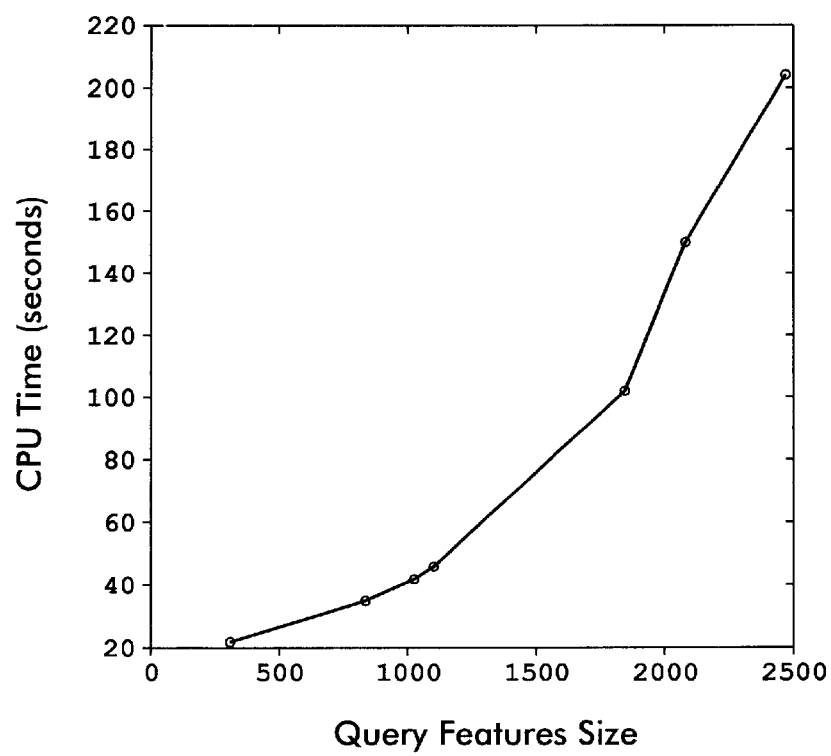
FIG. 15 is an elevational view of image data corresponding with text extracted from one of the title blocks of FIG. 9.
FIG. 16 is a graphical view illustrating time performance data for a geometric hash tree plotted as a function of query complexity.

Referring to FIGS. 9, 14 and 15, an example of operation for the Text Processing Module 134 is described. Referring conjunctively to FIGS. 9 and 14, it will be recognized that the illustrated text has its origin in the subject title block of FIG. 9. The image data shown in FIG. 15 represents a binary sample of the scanned field on the document of FIG. 9, where a black sample is a '1' and white sample is a '0'. The first step is to isolate the characters in the image by determining and encoding the contours of all the contiguous black areas on the image. The list of contours is filtered to remove small or unusually large contours that do not represent characters. Next, the contours are grouped together to form characters. While different grouping schemes are admissible in this framework, a scheme of grouping that groups contours with centers separated by 0.0125 inches and overlap in vertical extent by 45% was used.

Grouping is done by cycling through the list of contours and either forming a new group or adding contours to existing groups until there are no free contours left. Each group now represents a character which is rendered on a 128 pixel by 128 pixel raster. The rendered character is then passed to a normalization module, using algorithms and computer code provided by the National Institute of Technology and Standards, which corrects character slant and resizes the character to a standard 32 pixel by 32 pixel.

Normalization facilitates classifier training by reducing the intra-class variance of the features. There are 72 features extracted from each 32×32 pixel character image consisting of normalized horizontal and vertical, black and white run length counts. A feedforward neural-network having 15 nodes in the hidden layer was trained for each type of data, the input being 72 real numbers and the output being a vector of 10, 26, or 36 real numbers between 0 and 1, depending on whether the data type is numerical, alphabetic or alphanumeric, respectively. During recognition, the output node with the highest value is reported as the recognized class (characters).

Characters are sorted by position in the original document, left to right, top to bottom. Closely spaced, vertically overlapping recognized characters are collected into words. Vertically separated words are assigned to lines. A string in which words are separated by a single space and two spaces delimit lines is returned as the ASCII representation of the field.

5. Results

The performance of an exemplary indexing system implementation is now discussed. A database of scanned engineering drawings was assembled by scanning hardcopy drawings through a conventional large format scanner at 400 dpi resolution. The database included 1000 drawings. Since quantization levels based on the largest addable image sizes were used, new images can be added to the GHT without recomputation of the affine coordinates for previously present images. The performance of the indexing system is a function of the performance of title block localization, as well as character recognition.

The handprint recognition module was rigorously tested on standard data sets such as the UNLV database, and was shown to recognize characters with an accuracy of 95% for printed text and 68% for hand-printed text. The handprint recognition module was also tested to a limited extent in conjunction with the title block localization and indexing region extraction, with results achieved showing similar performance. Using one of the title block patterns of FIGS. 9 and 10, an image was found in the database that contained the title block. The result of localization is shown by overlaying the projected title block pattern (using the pose computed during location hashing) on the image found to contain the pattern. It has been found that a pattern can be localized accurately, notwithstanding differing positions and orientations between query patterns and model images.

5.1. Storage Performance

Since storage efficiency is an important aspect of the performance of indexing, the size of the GHT, the number of corner features generated in each drawing image, and the number of groups formed were all recorded. The number of groups formed was used as a basis to derive estimates for the size of the hash table in geometric hashing (using the formula $O(P*M^4)$ given earlier). The result of the recording is shown for a small fraction of the database in the following Table 1:

| S. No. | Features | Groups | Avg. basis per group | Geometric hash table | Location hash table | GHT nodes |
|---|---|---|---|---|---|---|
| 1. | 30305 | 502 | 98.6 | $4.6 \times 10^{10}$ | $1.87 \times 10^6$ | $2.1 \times 10^5$ |
| 2. | 6332 | 90 | 53.4 | $7.10 \times 10^8$ | $2.02 \times 10^5$ | $1.34 \times 10^4$ |
| 3. | 1810 | 89 | 23.3 | $1.42 \times 10^7$ | $3.5 \times 10^4$ | $2.3 \times 10^3$ |
| 4. | 2347 | 78 | 30.1 | $6.18 \times 10^7$ | $7.02 \times 10^4$ | $3.5 \times 10^4$ |
| 5. | 4552 | 101 | 44.06 | $3.78 \times 10^8$ | $2.1 \times 10^5$ | $2.35 \times 10^4$ |
| 6. | 12617 | 43 | 200.3 | $6.8 \times 10^{10}$ | $2.3 \times 10^6$ | $1.35 \times 10^6$ |

As demonstrated by the data of Column 2, the number of features is very large for most drawing images, and would have made localization by conventional model-based recognition methods difficult, if not impossible. As also demonstrated by the table, the GHT is a very space-efficient alternative to geometric hashing and represents a straight-forward array-based implementation of location hashing.

5.2 Indexing Time Performance

The actual CPU time for title block localization was recorded using a C/C++ implementation on a Windows NT platform (200 Mhz and 250 M page size). Although the code was not optimized for speed, the CPU time for indexing of a single curve group in a title block pattern is indicative of corresponding performance. The average CPU time for 40 title block query patterns was noted as a function of the database size. The result is plotted in FIG. 16. As can be seen, the time performance is not greatly affected by the complexity of the pattern (as indicated by the number of features), pointing to the indexing efficiency even for complex patterns.

5.3. Precision and Recall

To evaluate the effectiveness of location hashing of title blocks with respect to precision and recall, the actual number of occurrences of title block patterns in the drawing images of the database was recorded manually. For each query, significant hits were noted, and as many hits were verified as was needed to find all occurrences, until the maximum number of significant hits were reached. The number of title block occurrences in the top 10 hits was noted to give an indication of precision. The results for a few of the queries is shown in the following Table 2:

| Query Features | Actual Occurrences | Hits Examined | Matches in Top 10 Hits |
|---|---|---|---|
| 1010 | 8 | 67 | 4 |
| 1010 | 6 | 123 | 3 |
| 3746 | 7 | 83 | 5 |
| 870 | 25 | 35 | 9 |
| 1345 | 13 | 48 | 5 |
| 569 | 32 | 67 | 8 |

As can be seen, all the occurrences can be retrieved using location hashing by exploring only a few hits. Also, quite a few of the query pattern occurrences were retrieved within the top 10 hits.

6. Features

Various features of the above-described embodiments will be appreciated by those skilled in the art. First a data structure, referred to as a geometric hash tree ("GHT"), particularly well suited for storing pose-invariant feature information is provided. The GHT permits such information to be organized as a color tagged balanced binary tree, the tree permitting efficient storage of data in a manner that facilitates pattern searching/localization. The data structure has broad implications as a new geometric search tree for database organization, and as a tool in locating/recognizing arbitrary patterns within document processing systems.

Second, a system that permits automatic text extraction from title blocks of engineering drawing documents is provided. The system can readily be integrated with an image capture device (e.g., a large format scanner) to facilitate automatic drawing content-based document annotation prior to storing corresponding document sheets to a repository. The system combines geometric and text recognition capabilities to extract indexing information from engineering drawing images in a way that is invariant to (i) shape and style of title blocks, (ii) their position in drawings, (iii) the skew in the scanned drawing, and (iv) modest amounts of noise due to scanning and paper quality. As illustrated in FIG. 14 above, the system can recognize title blocks 138 even when their orientation does not correspond with the orientation of model title block 140.

What is claimed is:

1. A document processing system, comprising;
   a memory;
   a plurality of model images stored in said memory, the model images being represented by a first information set varying as a function of object-based coordinates, at least one of the plurality of model images including a text containing region corresponding to user defined document characterizing information, having index information intended for use in storing one or more document pages;
   a query image represented as a second set of information varying as a function of object-based coordinates;
   an image localization module, communicating with said memory, for corresponding the second set of information with a portion of the first set of information to obtain the text containing region; and a text extraction module, communicating with said image localization module, for extracting the index information from the text containing region to facilitate the storing of the one or more document pages.

2. The document processing system of claim 1, wherein the first and second sets of information at represented in affine coordinate space.

3. The document processing system of claim 1, wherein a geometric hash tree is developed from the first set of information.

4. The document processing system of claim 3, wherein the geometric hash tree is configured as a balanced binary search tree.

5. The document processing system of claim 1, further comprising an image capture device for creating the query image.

6. The document processing system of claim 5, wherein the image capture device is used to extract the query image from an engineering drawing document.

7. The document processing system of claim 1, wherein the query image is scaled before performing any operations with either said image localization module or said text extraction module.

8. The document processing system of claim 1, wherein the characterizing information includes at least one image processing transform to be performed relative to the index information.

9. The document processing system of claim 1, wherein the query image comprises a title block for an engineering drawing document.

10. The document processing system of claim 1, in which the index information is included in an ASCII file, further comprising a second memory for receiving the ASCII file along with the one or more electronic document pages.

11. In a document processing system having a memory In which a plurality of model images are stored, the model images being represented by a first information set varying as a function of object-based coordinates, at least one of the plurality of model images including a text containing region corresponding to user defined document characterizing information, having index information intended for use in storing one or more electronic document pages, a method for automatically processing a query image to obtain the index information from the text containing region of one of the model images, comprising:

(a) representing the query image as a second set of information varying as a function of object-based coordinates;

(b) corresponding the second set of information with a portion of the first set of information to obtain the text containing region; and (c) in response to said (b), extracting the index information from the text containing region to facilitate the storing of the one or more electronic document pages.

12. The method of claim 11, further comprising representing the first and second sets of information in an affine coordinate space.

13. The method of claim 11, further comprising developing a geometric hash tree from the first set of information.

14. The method of claim 13, wherein said developing structuring the geometric hash tree as a balanced binary search tree.

15. The method of claim 12, further comprising creating the query image with an image capture device.

16. The method of claim 15, in which the image capture device includes a wide format scanner, wherein said creating includes scanning an engineering drawing document with the wide format scanner.

17. The method of claim 16, in which the engineering drawing document includes a pixel array of at least 14,000× 9,000, wherein said creating includes scanning the at least 14,000×9,000 pixel array at a resolution of at least 400 dots per inch.

18. The method of claim 11, further comprising scaling the query image prior to performing said (a) and (b).

19. The method of claim 11, wherein said corresponding includes corresponding the index information with transform information.

20. The method of claim 19, further comprising performing a transform with respect to the index information by reference to the transform information.

21. The method of claim 11, wherein said performing comprises rotating the image information before performing said (c).

22. The method of claim 11, further comprising configuring the query image as a title block for an engineering drawing document.

23. The method of claim 11, further comprising configuring the query image in one of a plurality of image formats.

24. The method of claim 11, wherein said (c) includes forming an ASCII file with the index information, and further comprising storing the ASCII file in a second memory.

* * * * *